Figure 1:
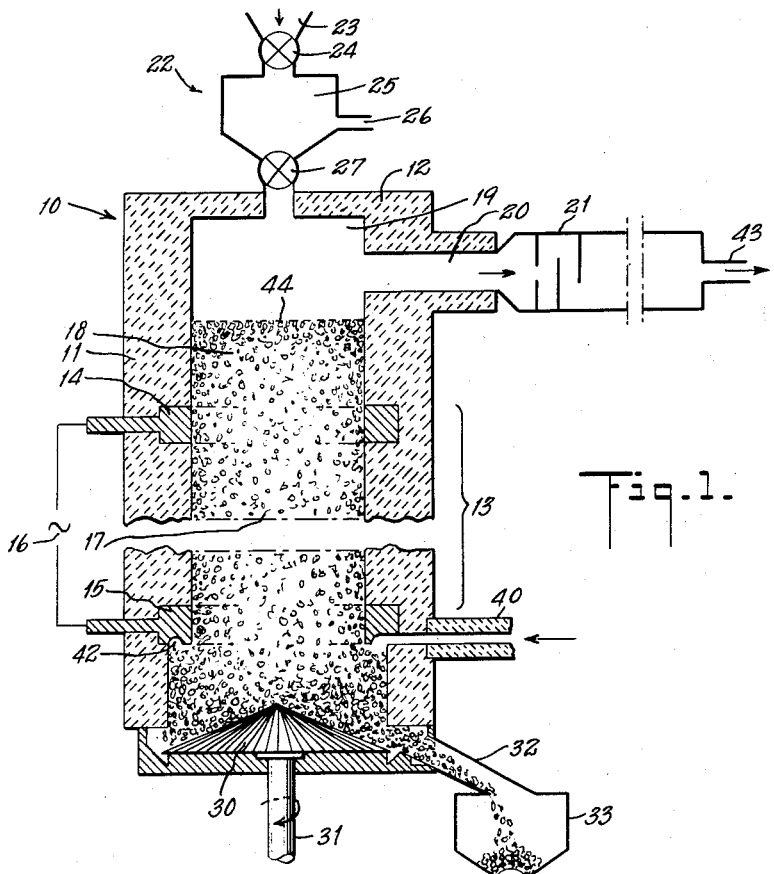

May 17, 1960 A. H. JOHNSTON ET AL 2,937,082
CONVERSION PROCESS FOR ALUMINUM SUBHALIDE DISTILLATION
Filed May 27, 1958

ALAN H. JOHNSTON
HANS OTTO BOHNER
NORMAN W.F. PHILLIPS
FREDERICK WILLIAM SOUTHAM
INVENTORS

BY Robert S. Dunham
ATTORNEY

United States Patent Office 2,937,082
Patented May 17, 1960

2,937,082
CONVERSION PROCESS FOR ALUMINUM SUBHALIDE DISTILLATION

Alan H. Johnston, Hans Otto Bohner, Norman W. F. Phillips, and Frederick William Southam, all of Arvida, Quebec, Canada, assignors to Aluminium Laboratories Limited, Montreal, Quebec, Canada, a corporation of Canada Application May 27, 1958, Serial No. 738,065

14 Claims. (Cl. 75—10)

This invention relates to the so-called subhalide distillation of aluminum from metallic materials or compositions, e.g. alloys which contain aluminum and other metals. In such process, which is also sometimes called a catalytic distillation, and which is predicated on chemical reactions of combination and dissociation rather than physical distillation, the invention is particularly concerned with improved procedure for heating the material and converting the aluminum to subhalide form by reaction with appropriate halide vapor.

In a preferred way of carrying out the subhalide process for refining or extracting aluminum, the metallic material, in divided solid form, is disposed in a suitable converter or furnace where it is heated and where a halide in gaseous state is passed through it, for example aluminum trichloride or tribromide, i.e. $AlCl_3$ or $AlBr_3$, also commonly called aluminum chloride and aluminum bromide. At appropriate temperature, ordinarily in the range of about 1000° C. and upwards, and under appropriate pressure, which may often be sub-atmospheric, the gaseous halide reacts with the aluminum in the material to produce, in gaseous form, an aluminum subhalide, e.g. a monohalide. Thus the conversion reaction, where the treating vapor is aluminum trichloride, is usually understood to be the reversible reaction of such compound with aluminum, yielding aluminum monochloride.

The gas or vapor withdrawn from the material under treatment therefore contains the aluminum subhalide (which may also be described as a dissociating halide of aluminum) together with unreacted halide, e.g. aluminum trichloride, to the extent that complete utilization of the reagent is not achieved. The produced gaseous mixture is led to a condensing region having a suitably lower temperature, where reverse reaction occurs, with the subhalide reverting to aluminum and normal aluminum halide. The metallic aluminum is deposited on suitable surfaces of the condenser, while the gaseous normal halide is carried off or may perhaps be condensed on relatively cooler surfaces, for recovery and re-use, in either case. By these chemical operations called subhalide distillation, highly or relatively pure aluminum is obtainable from impure metal or even from material containing a major proportion of other components than aluminum.

In practice, the body of aluminum-containing material can be effectively brought to the desired high temperature, and kept there during the halide treatment, by electrical resistance heating, i.e. by passing electric current directly through it. For example, the permeable mass of granular material may be contained in a refractory-lined vessel or furnace having internal electrodes at spaced localities, between which the current flows. Such converter or furnace may be of an upright shaft type, with embedded annular electrodes at vertically spaced localities and with arrangements for introducing the aluminum trichloride vapor and withdrawing the product gas, for removing spent solid material, and for inserting further quantities of unreacted alloy. The alloy material is conveniently prepared in a granular form, which may range from coarse powder (or fine granules) to relatively large lumps, the extent and character of subdivision being governed by the need for porosity to the gases and for a sufficiently high surface area of the solid to provide an efficient rate of removal of aluminum. In the operation of such a converter it has been proposed to introduce the unreacted halide gas at one end of the body of solid material and to withdraw the subhalide-containing gas from a highly heated zone of the mass, i.e. adjacent the electrode which is furthest from the locality of gas entrance, the principle of such operation being to remove the gas at a zone of maximum heat, for best economy in the separation of aluminum in subhalide form.

The use of electrical resistance heating to supply heat energy for the endothermic reaction in the converter is regarded as avoiding difficulties that would be encountered in certain other ways of furnishing heat. For instance, the nature of the reaction precludes the use of direct firing or other arrangements exposing the material to combustion or combustion products. External heating, meaning any procedure whereby heat is to be conducted through the wall of the converter or other structure from a localized source, appears undesirable for providing the relatively considerable flow of heat energy which the reaction must consume as it progresses. That is to say, with external heating applied to the body of solid fragments, lumps or granules constituting the charge in the reaction zone, for example with heating means around the converter or even with heating elements embedded in or otherwise exposed to the charge, it is difficult to obtain the heat transfer rates necessary for a large power input without causing considerable temperature gradients, and it is correspondingly difficult to avoid a low thermal efficiency. If there are large temperature variations between different localities of the charge, the special nature of the reaction is such that there will either be places of undesirably low temperature where there is little conversion of aluminum to subhalide (or even redeposit of metal from subhalide produced elsewhere), or if such situation is to be avoided, there will be some places kept at an excessively and thus wastefully high temperature, perhaps even to the point of objectionable melting of the material.

Although internal resistance heating, with electric current supplied in a manner that would be expected to distribute its flow through the charge, should obviate the above difficulties, it has been discovered that in many such cases a correspondingly serious problem arises. Specifically it is found that a highly uneven current distribution often occurs, with large temperature differences, of a random and unpredictable sort, among various parts of the charge. It has also been discovered that these non-uniform current conditions, with local overheating and large temperature gradients, arise in bringing cold charge material up to reaction temperature (as must be done continuously, in a continuous operation) and also tend to persist after the material has been brought, generally, to reaction temperatures. The condition of uneven heating may be so severe as to have other adverse effects on the practical accomplishment of the reaction, e.g. in that there may be agglomeration of particles or pieces of the charge due to local fusion.

It has now further been discovered that these difficulties can be avoided, and that the intended advantages of internal resistance heating can be realized, by procedure whereby the charge material is preheated to or above a particular temperature (having special relation to the nature of the material, as explained below) with external or other direct supply of heat energy. That is to say, by this combination of heating steps, wherein the first may be accomplished with means such as local heating elements or other conductive or radiant supply of heat and wherein only the second is accomplished by internal resistance heating (converting electric current to heat energy in the charge alloy itself), all of the above disadvantages are obviated and substantially more effective and efficient heating can be obtained for effectuation of the conversion to subhalide, than has been found possible either with external heating alone or with resistance heating alone.

By way of explanation, and in further reference to the difficulties encountered in using only resistance heating in the divided, solid charge, it has been found that certain aluminum-containing alloys or similar metallic materials or mixtures or aggregates of the type to which the subhalide distillation process is often applied, have a high negative temperature coefficient of resistivity over a considerable range of elevated temperatures. For instance, alloys containing aluminum (ranging downward and upward from 50%) and substantial amounts of elements such as iron and silicon, as well as titanium and carbon, may be such that the resistivity falls rapidly with increase of temperature, e.g. over a range from room temperatures up to about 1000° C. Under these circumstances it appears that upon directing electrical heating current through a fresh quantity or batch of the granular alloy material, such material is subject to serious current channeling, which causes the highly uneven temperature conditions and localized overheating, that are described above and that tend to persist in the charge even after reaction temperatures have been reached.

That is to say, in such case the electric current will tend to flow only through restricted paths because as soon as heating along a single path is begun the resistance falls and that path is then much more highly favored for passage of current. In consequence of such channeling a relatively inefficient heating operation results, and only a minor part of the total body is heated to the desired reaction temperature, such as 1100°, 1200° or higher. These uneven conditions tend to persist, too, as current is thereafter supplied to continue the introduction of heat energy over such time as may be required for further conversion reaction in the heated material. If the material, however, is preliminarily heated to a temperature at least about equal to the upper limit of the range over which the material has a high negative temperature coefficient of resistivity (as explained above), then all of it (in the body) starts, so to speak, in a highly heated condition, and there is no reason for current channeling to start or build up. In consequence the entirety of the mass can be readily kept at the desired high temperature by electrical heating, for the considerable time that may be needed for reaction with the traversing stream of gas.

This preliminary heating of the supplied granular alloy or the like can be effectuated by external heating means through a container wall or by radiation or by circulation of an appropriately heated fluid. Thus in general any method of supplying heat as such from an etxernal source, i.e. by conduction, convection or radiation, may be used, such procedure being herein defined as external heating in contradistinction to internal resistance heating where the heat energy is produced directly from electric current flowing through the material itself. For instance, the cold charge material, or successive quantities of it in a continuous process, may be preheated by heating elements, e.g. electrically energized heater rods or the like, arranged in radiating or thermally conducting relation to the material. Furthermore it is found that the charge alloy can be effectively brought to the desired preheat temperature by external means, without any adverse effects of substantial temperature gradients as where such external heating is sought to be used for the relatively large and continuing flow of heat that the conversion reaction requires. That is to say, in the preheating step the material need only be brought up to the desired high temperature, and such can be attained sufficiently uniformly by external heating, since there is no withdrawal of heat energy by reaction.

Hence the invention, in its general aspects, comprises the successive steps of first bringing the solid alloy or like material of the described character up to a desired temperature (at least sufficiently high as to avoid any objectionably large negative temperature coefficient of resistivity) by external heating, and therafter continuing the supply of heat energy by internal resistance heating, for effectuating the conversion reaction (with supplied halide gas) to produce the desired subhalide. In this way, a highly effective operation is obtained, with much improved thermal efficiency in performance of the reaction and without current channeling or similar effects. While the process is manifestly applicable to batch operations, it is particularly appropriate for continuous methods, such term including substantially continuous procedures where portions of fresh charge are added in intermittent succession, e.g. to travel first through a preheating zone and then to and through a reaction region bounded (in the direction of travel or transversely) by spaced electrodes between which electric current flows. In the latter region the charge is exposed to the normal halide gas, for example $AlCl_3$, and by the conversion reaction, aluminum is removed as the gaseous subhalide, e.g. aluminum monochloride.

It will be understood that where the preheating is accomplished by means such as heated elements or walls and where the product subhalide gas must travel through the fresh charge material in the preheat zone, it is necessary to carry the preheating substantially to the reaction temperature (as indeed may readily be done) if it is desired to avoid redeposition of some aluminum in such zone.

A specific and unusually effective aspect of the invention, however, involves the novel operation of preheating the fresh or unreacted alloy by partial reversion of the subhalide reaction, in the subhalide-containing gas which leaves the body of material under treatment in the converter. It has been discovered that complete and effective preheating of the material, with good over-all economy in the use of heat and without sacrifice of the ultimate recovery of aluminum as desired, can be achieved in this way, i.e. by passing the reacted, subhalide-containing gas through the fresh granular alloy so as to heat the latter by reverse reaction of part (preferably a minor part) of the subhalide into aluminum and normal halide. Although this operation re-deposits some aluminum in the fresh or incoming alloy, thereby requiring, for instance, a longer duration of treatment in the main reaction zone in order to achieve the desired recovery of aluminum in the condenser, the unusual convenience and economy which are found to accompany this mode of preheating are of greater significance and far outweigh the effect on the time of treatment.

An effective embodiment of the process just described is essentially as follows: A body of granular aluminum-containing material is established in a suitable vessel or converter, such initial body of material having been preliminarily brought to reaction temperature, before or on introduction to the converter (which should itself be preheated, too), as by temporary use of special heating operations, such as described below. Then halide gas is passed into and through the material while it is subjected to internal heating by conduction of current between spaced localities. At the same time a substantial body of unreacted aluminum-containing material is maintained adjacent the mass in the reaction zone, e.g. as a layer of substantial depth above such body in a shaft-type converter, and the reacted, aluminum subhalide-containing gas, leaving the conversion zone at substantially the reaction temperature, is drawn through the granular unreacted material. A reversion of the subhalide reaction occurs, in that the exposure of the gas to the lower temperature of the unreacted material causes a part of the aluminum subhalide to become reconverted into aluminum and the normal aluminum halide, and heat is thereby produced and applied throughout the granular solid with no more than an essentially slight reduction in the actual temperature of the passing gas itself.

That is to say, by the exothermic nature of the reverse reaction, effective heating of the material is achieved, while maintaining the finally discharged gas in a highly heated condition so as to transport a substantial portion of aluminum subhalide to the condenser where the major part of the reverse reaction occurs, to deposit the desired purified aluminum. As successive portions of spent material are removed from the bottom of the converter, additions are made at the top of the body of fresh charge and correspondingly lower portions of the latter, highly preheated by the operation described above, and indeed being at each time the hottest part of the unreacted body, descend or are advanced into the main reaction zone. Hence in the course of continuing operation, the reaction zone is supplied only with material in a highly heated state, so that thorough and uniform electric heating is possible, without current channeling.

Although as in other modes of carrying out the invention some contribution of heat to the fresh charge occurs by conduction from the mass under reaction (below the layer of fresh material), the great preponderance of heat, in most instances of the process just described, is evolved by the reverse chemical reaction. Thus the purpose of preheating is effectively served, e.g. to bring the fresh charge to a temperature essentially or almost as high as that desired in the reaction zone. The aluminum deposited in the unreacted charge is ultimately removed (by conversion to subhalide) in the main reaction, along with the desired and usually high proportion of the aluminum originally present in the material; hence there is essentially no over-all loss of product.

Figure 2:
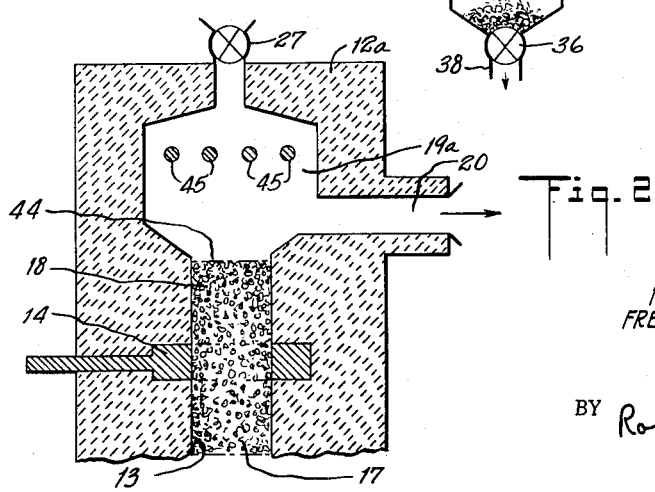

Further description of the process, including specific examples thereof, is set forth in connection with the accompanying drawing, wherein:

Fig. 1 is a view in vertical section, largely diagrammatic and with accompanying equipment in diagrammatic form, showing a continuous shaft converter arranged to provide a general illustration of means for carrying out the invention, and also to illustrate specifically the preheating step by partial reconversion of subhalide; and Fig. 2 is a fragmentary view, as of a portion of Fig. 1 on a reduced scale, showing a specific arrangement wherein external preheating elements are used for the process.

Although other shapes and forms of apparatus may be employed, the illustrated converter 10 in Fig. 1 is advantageously of the vertical shaft type (to which the invention, in a specific sense, is specially adapted), consisting of an upright cylindrical vessel or furnace having refractory walls 11 and cover 12, or equivalent refractory lining. The central and lower part 13, having a vertical extent or dimension generally designated by the bracket symbol, constitutes the conversion or main reaction zone bounded at the top and bottom by annular electrodes 14, 15 set flush in the cylindrical refractory wall, although inwardly protruding electrodes, preferably slanted in a downward direction, can be used in some cases. The illustrated electrodes 14, 15 are connected to a suitable source of current 16 (either alternating current, as indicated, or direct current) so that heating of the granular charge 17, under treatment, is effected by current flow through it from one electrode to the other.

The converter chamber extends a substantial distance above the main reaction zone 13 so as to provide space 18 for a body of unreacted charge resting on the main body in the zone 13, and a gas collection space 19 from which a passage 20 leads to the condenser 21. The condenser may be of appropriate structure, such as known to be suitable for the aluminum-depositing reaction, with baffles or other extended condensing surfaces if desired. Feed of granular charge into the converter shaft is accomplished through suitable means, for example a lock device 22 having an inlet hopper 23, a rotating gate 24, an intermediate feed chamber 25 (with outlet 26 for removal of air introduced with the alloy) and a further rotating gate 27. Thus successive quantities of charge are fed down into the vessel 25, by successively opening the gate 24, and at intermediate times are advanced by gravity into the converter chamber upon successive openings of the gate 27.

Spent or extracted alloy charge is removed from the foot of the chamber, for example with the aid of a rotary discharge device comprising an upright, plain or fluted cone 30 slowly rotated by a vertical shaft 31 so that the bottom portion of the charge body is correspondingly agitated and carried past a discharge spout or conduit 32 into a collection hopper 33 from which successive portions are removed by a lock device 34. The device 34 may be similar to the device 22 comprising a pair of gates 35, 36 with an intermediate vented chamber 37, so that recovery of the spent material is obtained through the discharge passage 38. As will be understood, the converter is operated essentially continuously and may be appropriately defined as such, although the inlet of fresh charge and the withdrawal of spent alloy are accomplished by successive increments. The entire movement of charge is achieved by gravity, including the gradual downward displacement of granular material within the converter chamber, such material moving slowly down through the space 18 into and through the conversion zone 13, and when spent, traveling from the latter past the discharge device 30 and on into the exit chute 32.

Appropriate halide vapor such as aluminum trichloride ($AlCl_3$), evolved or vaporized in suitable other apparatus (not shown), or recirculated, is introduced through the conduit 40 below the reaction zone, being conveniently distributed by suitable means such as a distributing ring or annular undercut groove 42 in a shoulder constituted by an exposed lower portion of the ring-shaped electrode 15. The halide gas passes upward through the granular charge 17 in the zone 13, undergoing the conversion reaction at the maintained high temperature whereby aluminum is extracted from the alloy, with the production of aluminum subhalide in gaseous state. The gas travels continuously upward through the fresh body of charge (which may be originally cold as introduced through the device 22) in the zone 18 and passes out through the exit port 20 to the condenser 21.

By virtue of a substantial temperature drop in the condenser, for example a drop of the order of 600° C. between the space 19 and the further end of the condenser, the reverse reaction occurs, preferably to a substantially complete extent, whereby pure metallic aluminum is deposited on the condenser surfaces. The resulting gas, now essentially all restored to original halide, e.g. aluminum trichloride, is withdrawn from the condenser through exit duct 43. It will be understood that passage of gas through the equipment may be effected by appropriate pumping means (not shown), disposed for instance in the conduit 43 so as to suck the gas through the converter 10. The desired pressure conditions in the converter, either atmospheric or above or more usually below atmospheric, may be maintained by appropriate control and pumping facilities at necessary locations in the path of gas flow, as by using a vacuum pump in the line 43 if a very low pressure is desired.

In operation, the material charged may consist of alloyed or otherwise inseparably mixed or aggregated metals, including a substantial but not necessarily major content of aluminum, together with other metals such as iron, silicon and titanium, as well as further metals, and also carbon, it being understood that the non-aluminum components or constituents may consist of various elements in the foregoing category. The composition or mixture is often such, e.g. particularly in alloys of aluminum with one or more of the other elements named above, as to have a negative temperature coefficient of resistivity throughout a substantial range of elevated temperatures. Although the invention is applicable to aluminum-containing metal from other sources, it is noted that in general all of the alloys or crude metals made from aluminum ore that are suitable for subhalide distillation appear to have a negative coefficient of this sort. The upper limit (if any) of such range of temperatures often at least approaches temperatures of the general order of those required for the conversion reaction.

As indicated above, the invention is useful with various charge materials, but is particularly applicable to the extraction of aluminum from alloys or like metallic mixtures that are produced by the electrothermal or other direct reduction of bauxite or other aluminum ore.

In the practice of the subhalide distillation process, the converter is initially filled to the indicated upper level 44 of the body of charge in the zone 18, and the heating current is applied to the electrodes 14, 15; very preferably some supplemental preheating of the charge material, before or upon introduction, is effected at the very outset, to get the first quantity of reaction zone material 17 to a uniform temperature. It will be understood that in addition to a special heating of the initial quantity of charge material, the converter structure itself should ordinarily be brought to a temperature of 1000°–1200° C. before starting, for instance by first feeding through it a charge of graphite or coke lumps through which current is passed, between the electrodes 14, 15. Then with the converter heated up and the initial amount of aluminum-bearing material heated and in place as described above, the desired operation proceeds, with the halide vapor (aluminum trichloride) entering through the passage 40 and passing upwardly throughout the charge body 17, while the latter is maintained at the desired reaction temperature by the current flow.

In accordance with the present invention, the waiting body of fresh charge material in the zone 18 is subjected to preheating by means other than the passage of electric current through it, so that as successive portions descend into the reaction zone, they have been brought to a temperature to prevent current channeling in the main body 17. For example as shown in Fig. 2, where the apparatus is otherwise the same as in Fig. 1 and where like parts are similarly numbered, the upper space 19a may contain suitable heating means such as a plurality of electric heating elements or rods 45, shown in cross-section as extending horizontally in a spaced array across this region, and constituting resistance elements energized by current from a suitable source, not shown. By radiation from these elements, successive increments of fresh charge (falling from the gate 27) and the body of such material in the zone 18, are heated to the desired high temperature, substantially the same as maintained in the reacting mass 17, before descending to become part of the latter.

The preheating step can be performed with heat from any source external to the charge alloy particles. Thus instead of the elements 45 in Fig. 2, a notably advantageous source can comprise (as explained above) the exothermic reaction occurring when the subhalide gas from the zone 13 is partially reconverted to normal halide and aluminum metal. Thus, for example, Fig. 1 may be taken to illustrate the apparatus as used for such operation. In this (as indeed in other cases) it will be understood that by the time the gas reaches the upper boundary of the conversion zone 13 designated by the upper point of the bracket symbol in the drawing, it contains at least a substantial proportion of subhalide, e.g. aluminum monochloride, and it has essentially the temperature of the reaction zone. As this gas traverses the bed or body of unreacted and otherwise untreated charge (in the zone 18), the cooler temperature of the latter is effective to create a reversal of the subhalide conversion, e.g. to the extent of about one-third of the aluminum originally converted (in the zone 13) to subhalide form.

The heat thus liberated or extracted by the reversal of reaction very effectively serves, as explained above, to raise the temperature of the originally cold charge in the zone 18 to nearly that of the reaction zone, particularly in the lower portion of such unreacted material. At the same time the gas remains in a highly heated state, for example having a temperature not more than 40° or 50° below that of its departure from the reaction zone 13 when the latter is in the range of, say 1000° to 1400° C. The heated gas, still containing a substantial proportion of aluminum in subhalide form, then passes to the condenser 21, where essentially complete reversion occurs, depositing aluminum in purified state. Thereupon the resulting gas, e.g. now all restored to aluminum trichloride, is withdrawn through the pipe 43, to be available for recovery and re-use.

At appropriate and convenient intervals, further quantities of charge are introduced through the device 22 and spent charge is essentially continuously withdrawn from the foot of the furnace through the conduit 32. Thus the entire body of fresh charge (in the zone 18) and reacting charge 17 moves slowly downward through the shaft, bringing highly preheated charge into the conversion zone 13.

The result of the preheating by reconversion of subhalide is to introduce some aluminum metal into the fresh granular alloy in the zone 18, but the properties of the latter are essentially unchanged and such aluminum is entirely suitable for extraction, along with originally present aluminum, by the conversion reaction in the zone 13.

As specific examples of the various operations described above, extensive tests have been made with alloys (in granular form) in the composition range as follows:

| | Percent |
|---|---|
| Aluminum | 40 to 65 |
| Iron | 20 to 45 |
| Silicon | 2 to 20 |
| Titanium | 2 to 6 |
| Carbon | 3 to 6 |

Beds of granular alloys of this character have a resistivity at 20° C. within the range of about 50 to 5000 ohm-centimeters. The resistivity drops rapidly with increasing temperature to a value of about 0.1 ohm-centimeter at 1000° to 1100° C., and then decreases more slowly to 0.05 to 0.1 at 1400° to 1500° C. Because of the large negative temperature coefficient of resistivity, particularly in the course of temperature rise to the 1000° to 1100° C. level, and because the reaction temperature desired in the zone 13 is at or above this level, it is necessary to heat the alloy material to such point or preferably above it, before it descends into this zone of current flow between the electrodes 14 and 15. If the alloy is substantially colder, there is likely to be current channeling, with highly disadvantageous consequences as explained.

As an instance of operation using apparatus such as shown in Fig. 2, the alloy (of the above type) entering the reactor at an average rate of 2 cubic feet per hour is preheated at 18 by the elements 45, in the form of graphite resistors, to a temperature of 1050° to 1250° C. before it descends into the direct resistance heating zone 13. It will be understood that before starting up, the entire body of charge 17 in the zone 13 is first heated (by passage through the preheat zone or otherwise) to 1050°–1250° C. Then aluminum trichloride gas, preheated to 1000°–1300° C. is passed through the converter, say at a rate of 450 to 600 pounds per hour, while heat is supplied to the charge 17 by current flow between the electrodes 14, 15 and while preheating continues for the fresh material in the zone 18, the latter being maintained (by additions) to a level 44 having a height above electrode 14 which may be about equal, for instance to the diameter of the furnace shaft at 18 and 13. Although in some cases provision may be made to withdraw the aluminum monochloride-containing gas at about the level of the electrode 14 so that it does not appreciably traverse the body in the zone 18 and so that the latter body need only be preheated to about the upper limit of the large negative temperature coefficient of resistivity of the alloy (if such limit is lower than the main reaction temperature), the preheating is carried, in the above operation, to approximately the temperature of the reaction in the zone 13. Hence there is little or no reconversion of aluminum monochloride as the gas passes through the bed in the zone 18, enroute to the condenser or decomposer 21 for the desired recovery of pure aluminum metal there.

In tests as just described, the resistance heating in the zone 13 was highly uniform and free of any objectionable current channeling effects. A power input of more than 5 kw. per cubic foot was obtained, corresponding to an extraction of approximately 5 pounds of aluminum per cubic foot per hour. Temperatures around the circumference of the moving column of charge were found to be equal within ±2.5%. As indicating the completeness of preheating, the net power input to the radiators 45 corresponded to about 80% to 100% of the heat content of the alloy at 1200° C.

Referring now to examples of the procedure of preheating by subhalide reconversion, alloys of the above character are likewise used, and aluminum trichloride vapor is introduced through the conduit 40 (Fig. 1) as the reagent halide. In such cases where the unreacted charge body in the zone 18 is otherwise unheated, it is found that the subhalide-containing gas traversing such body not only partially dissociates or decomposes as explained, but in doing so liberates about 1 kilowatt hour of heat per pound of aluminum thereby condensed in the charge material. The conditions of conversion in the chamber portion 13 may conveniently be such that the material is essentially 90% extracted, i.e. 90% of the aluminum contained in the original alloy plus all of that deposited in the zone 18 being converted to aluminum monochloride. With the top portion of the converter suitably insulated, as by using refractory material 11, 12 of good thermal insulation properties, no more than about one-third of the aluminum content of the gas will be condensed in the alloy body in the zone 18 above the upper electrode 14, and the temperature of the gas leaving the converter through the space 19 will be only a little below that at which it left the electrode region. At the same time, by the release of heat in the reverse reaction, the alloy entering the electrode region from the bottom of the body in the zone 18, is abundantly preheated.

In a general sense, the preheating by reverse reaction in the untreated charge is preferably carried either to a temperature which represents the uppermost limit of the range through which the material has a negative temperature coefficient of resistivity, or to the desired reaction temperature for the conversion zone, whichever is the lower. That is to say, if the negative temperature coefficient has a high value through and beyond the desired reaction temperature, the preheating should be effected substantially to such reaction temperature, but if the negative coefficient becomes relatively small at some lower temperature (e.g. as in certain specific alloys mentioned above) the heating by reverse reaction need only extend to the upper limit of the negative coefficient, although it may usefully be carried to a point nearer that of the reaction. As will now be appreciated, a desired temperature of preheat, by this reconversion method, can be readily achieved with appropriate choice or control of governing factors such as the relative rates of distillation and alloy addition, and the geometry and thermal losses of the upper section of the converter.

As an instance of converter structure and operation with this specific method, the shaft converter in Fig. 1 may have an internal chamber with a diameter of 2 feet and a distance between electrodes 14, 15 (being the height of the zone 13) of approximately 10 feet. Alloy is introduced through the lock 22 at a rate of approximately 2 cubic feet per hour, and preheated aluminum trichloride gas (e.g. having a temperature approaching 1000° C.) is introduced through the conduit 40 at the rate of about 1000 pounds per hour. With the charge material containing roughly 50% aluminum (more or less), the ultimate production of purified aluminum in the condenser 21 will be about 100 pounds per hour. One example of an alloy of the character described, capable of such production, has the following composition: aluminum 53%, iron 29%, silicon 6%, titanium 3%, carbon 4%, oxides and minor impurities 5%.

In operation of this type, having outlet gas pressure at the passage 20 of approximately 1 atmosphere, the alloy and gas temperatures immediately above the current-carrying zone, i.e. adjacent the upper edge of the electrode 14, are both approximately 1290° C. The gas leaving the converter is cooled to no lower than a temperature of about 1265° C. in heating the unreacted bed of granular alloy in the zone 18, the latter being brought to a temperature of about 1290° C. in the portion which is lowest in the shaft, i.e. nearest the zone 13. Under such circumstances, about one-third of the aluminum distilled in monochloride form in the conversion zone is removed from the gas by the reverse, condensing reaction. In a furnace of these approximate dimensions and with conditions as stated, the vertical depth of the unreacted body of charge in the zone 18 may be from 1 to 2 feet, the top level 44 being thus not more than about 2 feet above the electrode 14.

The various procedures of the invention afford effective realization of the supply of heat energy to the reaction by internal resistance heating, for corresponding efficiency of extraction of purified aluminum, without current channeling or similarly objectionable effects. While certain modes of preheating have been described as alternative, it is conceived that combined operations may be used, for example in supplying part of the heat by the reverse subhalide reaction, with supplemental heat from one or more heating elements or like sources.

This application is a continuation-in-part of copending application Serial No. 649,025, filed March 28, 1957, by two of us, Norman W. F. Phillips and Frederick William Southam, and now abandoned.

It will be understood that the invention is not limited to the specific compositions and procedures herein described but may be carried out in other ways without departure from its spirit.

We claim:

1. In a process for separation of aluminum by subhalide distillation at a predetermined elevated temperature from metallic material that contains aluminum and other metal and that has a negative temperature coefficient of resistivity over a range of elevated temperatures which extends upward from a point substantially below the aforesaid predetermined temperature, the procedure of preheating the said metallic material by supplying heat thereto from a source external to the material itself, to bring said material to a temperature at least about as high as the lower of the following temperatures: the upper limit of the aforesaid range, and the aforesaid predetermined elevated temperature; and passing gaseous halide into contact with said preheated material to react therewith for production of aluminum subhalide in gaseous form, while supplying heat energy to the material to effectuate said reaction by passing electric current through the material to maintain it at said predetermined elevated temperature.

2. In a process for separation of aluminum by subhalide distillation at a predetermined elevated temperature from metallic material that contains aluminum and other metal and that has a negative temperature coefficient of resistivity at least through a range of elevated temperatures below said predetermined elevated temperature, the procedure of preheating the said metallic material to approximately said predetermined temperature by supplying heat to said material from a source external to the material itself, and passing gaseous halide into contact with said preheated material to react therewith for production of aluminum subhalide in gaseous form, while supplying heat energy to the preheated material to effectuate said reaction by passing electric current through the preheated material to maintain it at said predetermined temperature.

3. Procedure as defined in claim 1, wherein the preheating is effected by radiating heat into the material from heated surfaces disposed in radiating relation thereto.

4. Procedure as defined in claim 1, wherein successive quantities of the material are progressively advanced through a preheating zone and a reaction zone so that first and second bodies of the material are respectively continuously maintained in said preheating and reaction zones, said passage of electric current being effected through the material in the reaction zone while the gaseous halide is passed into contact therewith, and the preheating of said first body in the preheating zone being effected by passing reacted, subhalide-containing gas from said second body in the reaction zone into contact with said first body in the preheating zone, to supply heat by partial reversal of reaction of the aluminum subhalide.

5. In a process for separation of aluminum by subhalide distillation at a predetermined elevated temperature from successive quantities of metallic material that contains aluminum and other metal and that has a negative temperature coefficient of electrical resistivity over a range of elevated temperatures which extends upward from a point substantially below the aforesaid predetermined temperature, the procedure of passing gaseous halide into contact with a first body of said material to react therewith for production of aluminum subhalide in gaseous form, while heating said first body of material by passing electric current through the same to maintain the material at said predetermined temperature for said reaction, maintaining a second body of said material in unreacted form in position to be subjected to said electrical heating and halide treatment in succession to the material of the first-mentioned body, and preheating said second body of unreacted material by supplying heat thereto from a source external to the unreacted material itself to bring said unreacted material to a temperature at least about as high as the lower of the following temperatures: the upper limit of the aforesaid range, and the aforesaid predetermined elevated temperature; said process including successively reconstituting said first body with preheated material of the second body, successively reconstituting the second body with fresh unreacted material, and continuing said electrical heating and halide treatment of the first body, so that said treatment is effected on successive quantities of preheated material.

6. The process of claim 5, wherein the second body rests on the upper end of the first body, said bodies being enclosed in an upright space and being arranged to constitute a continuing upright mass in said space, said electric current being passed between spaced localities of the first body which are disposed so that the paths for said current extend to the upper end of the first body, said halide gas being passed from a lower region of said space upwardly through the first body, and as subhalide-containing gas, on up through the second body, said process including feeding fresh quantities of said unreacted material into the upper end of said space upon the second body and withdrawing successive quantities of spent material from the lower end of said space, so the material travels downwardly through the space by gravity, said process including withdrawing the gas from the second body and removing said gas from the upper end of said space, said preheating being effected by radiating heat toward the second body from a heat source in said upright space above the second body, for directing heat to the successive fresh quantities of material and for thereby heating the second body to approximately the aforesaid predetermined temperature, and by thus bringing said second body to said predetermined temperature, preventing substantial reversal of reaction of the subhalide-containing gas as it traverses the second body.

7. The process of claim 5, wherein the second body rests on the upper end of the first body, said bodies being enclosed in an upright space and being arranged to constitute a continuing upright mass in said space, said electric current being passed between spaced localities of the first body which are disposed so that the paths for said current extend to the upper end of the first body, said halide gas being passed from a lower region of said space upwardly through the first body, and as subhalide-containing gas, on up through the second body, said process including feeding fresh quantities of said unreacted material into the upper end of said space upon the second body and withdrawing successive quantities of spent material from the lower end of said space, so the material travels downwardly through the space by gravity, said process including withdrawing the gas from the second body and removing said gas from the upper end of said space, said preheating being effected by passing the reacted, subhalide-containing gas from the first-mentioned body of material into contact with said second body of unreacted material, as aforesaid, for preheating said second, unreacted body by partial reversal of reaction of the aluminum subhalide, and said process including conducting the gas from the upper end of the aforesaid space to a locality for recovery of aluminum therefrom by further reversal of reaction of the subhalide.

8. In a process for separation of aluminum by subhalide distillation at a predetermined elevated temperature from successive quantities of metallic material that contains aluminum and other metal and that has a negative temperature coefficient of electrical resistivity at least through a range of elevated temperatures which extends upward from a point substantially below the aforesaid predetermined temperature, the procedure of passing gaseous halide into contact with a first body of said material, at a predetermined locality, to react therewith for production of aluminum subhalide in gaseous form, while heating said first body of material by passing electric current through the same at said locality to maintain the material at said predetermined temperature for said reaction, maintaining a second body of said material in unreacted form adjacent said first-mentioned body, for advance of unreacted material from said second body into said locality, to be subjected to said electrical heating and halide treatment in succession to the first-mentioned material of the first body, and preheating said second body of unreacted material by supplying heat thereto from a source external to the unreacted material itself to bring said unreacted material to approximately the aforesaid predetermined temperature, said process including originally constituting said first body with material that has been preheated, advancing successive amounts of preheated unreacted material from the second body to reconstitute the first body therewith, and continuing said electrical heating and halide treatment of said first body as successively reconstituted with preheated unreacted material.

9. The process of claim 8, wherein said preheating is effected by transferring heat to the second body from heated elements maintained in heat-transferring relation to the second body.

10. In a process for separation of aluminum by subhalide distillation at a predetermined elevated temperature from successive quantities of metallic material that contains aluminum and other metal and that has a negative temperature coefficient of electrical resistivity at least through a range of elevated temperatures which extends upward from a point substantially below the aforesaid predetermined temperature, the procedure of passing gaseous halide into contact with a first body of said material to react therewith for production of aluminum subhalide in gaseous form, while heating said first body of material by passing electric current through the same to maintain the material at said predetermined temperature for said reaction, maintaining a second body of said material in unreacted form in position to be subjected to said electrical heating and halide treatment in succession to the material of the first-mentioned body, and passing the reacted, subhalide-containing gas from the first-mentioned body of material into contact with said second body of unreacted material, for preheating said second-mentioned, unreacted body by partial reversal of reaction of the aluminum subhalide, and withdrawing the gas from the second body to a locality for recovery of aluminum therefrom by further reversal of reaction of the subhalide, said process including successively reconstituting said first body with preheated material of the second body, successively reconstituting the second body with fresh unreacted material, and continuing said electrical heating and halide treatment of the first body, so that said treatment is effected on successive quantities of preheated material.

11. In a process for separation of aluminum by subhalide distillation at a predetermined elevated temperature from successive quantities of metallic material that contains aluminum and other metal and that has a negative temperature coefficient of electrical resistivity at least through a range of elevated temperatures which extends upward from a point substantially below the aforesaid predetermined temperature, the procedure of passing gaseous halide upwardly through a first body of said material to react therewith for production of aluminum subhalide in gaseous form, while maintaining said first body in an upright space and while heating said first body of material by passing electric current through the same between the uppermost locality thereof and a lower locality thereof, to maintain the material at said predetermined temperature for said reaction, maintaining a second body of said material in unreacted form immediately above the first body for movement down into the position of the first body for subsequent electrical heating and halide treatment, and passing the reacted, subhalide-containing gas from the first-mentioned body of material upwardly through said second body of unreacted material, for preheating said second-mentioned, unreacted body by partial reversal of reaction of the aluminum subhalide, and withdrawing the gas from the top of said second body to a locality for recovery of aluminum therefrom by further reversal of reaction of the subhalide, said process including removing spent material from the first body, advancing successive amounts of preheated unreacted material from the second body down to reconstitute the first body therewith, and continuing said electrical heating and halide treatment of the first body as successively reconstituted with preheated unreacted material.

12. In a process for separation of aluminum by subhalide distillation at a predetermined elevated temperature from granular metallic material that contains aluminum and other metal and that has a negative temperature coefficient of electrical resistivity at least through a range of elevated temperatures which extends upward from a point substantially below the aforesaid predetermined temperature, the procedure of passing gaseous halide through a first body of said material to react therewith for production of aluminum subhalide in gaseous form, while heating said first body of material by passing electric current through the same to maintain the material at said predetermined temperature for said reaction, withdrawing successive quantities of spent material from one end of said first body, supplying additional quantities of said material to the other end of said first body, maintaining a second body of said additionally supplied, unreacted material adjacent said last-mentioned end of the first-mentioned body, and passing the reacted, subhalide-containing gas from the first-mentioned body of material through the said second body of unreacted material, for preheating said second-mentioned, unreacted body by partial reversal of reaction of the aluminum subhalide, to elevate the temperature of the quantities of unreacted material supplied from the second body to the first body to a value which is at least about as high as the lower of the following temperature: the upper limit of the aforesaid range, and the predetermined reaction temperature, said process including supplying the additional quantities of unreacted material to the said other end of the first body by advancing said quantities in preheated condition from the second body.

13. In a process for separation of aluminum by subhalide distillation at a predetermined elevated temperature from granular metallic material that contains aluminum and other metal and that has a negative temperature coefficient of electrical restivity at least through a range of elevated temperatures which extends upward from a point substantially below the aforesaid predetermined temperature, the procedure of passing gaseous halide upwardly through a first body of said material to react therewith for production of aluminum subhalide in gaseous form, while heating said first body of material by passing electric current through the same between spaced localities thereof of which one is adjacent the upper end of the first body, for maintaining the material at said predetermined temperature for said reaction, withdrawing successive quantities of spent material from the lower end of said body, supplying additional quantities of said material to the upper end of said first body, maintaining a second body of said additionally supplied, unreacted material adjacent said upper end of the first-mentioned body, and passing the reacted, subhalide-containing gas from the upper end of the first-mentioned body of material upwardly through the said second body of unreacted material, for preheating said second-mentioned, unreacted body by partial reversal of reaction of the aluminum subhalide, to elevate the temperature of the quantities of unreacted material supplied from the second body to the first body to a value which is at least about as high as the lower of the following temperatures: the upper limit of the aforesaid range, and the predetermined reaction temperature, said process including supplying the additional quantities of unreacted material to the said upper end of the first body by advancing said quantities in preheated condition from the second body.

14. In a process for separation of aluminum by subhalide distillation at a predetermined elevated temperature from successive quantities of metallic material that contains aluminum and other metal and that has a negative temperature coefficient of electrical resistivity at least through a range of elevated temperatures which extends upward from a point substantially below the aforesaid predetermined temperature, the procedure of advancing successive quantities of said material down through vertically successive preheating and reaction zones in an upright space so that bodies of said material are maintained respectively in said zones, passing gaseous halide upwardly through said space to traverse the material in the reaction zone, and thereafter as reacted, subhalide-containing gas, to traverse the material in the preheating zone, passing electric current through the material in the reaction zone between spaced localities of which one is at the top of the reaction zone and another is at a lower part thereof, to maintain the material at said predetermined temperature for reaction of halide with aluminum in the material to yield gaseous aluminum subhalide, said passage of reacted, subhalide-containing gas through the material in the preheating zone being effective to preheat such material by partial reversal of reaction of the aluminum subhalide, and conducting gas from an upper part of said space above the preheating zone, to a locality for recovery of aluminum therefrom by further reversal of reaction of the subhalide.

References Cited in the file of this patent

UNITED STATES PATENTS

| | | |
|---|---|---|
| 1,344,153 | Shoeld | June 22, 1920 |
| 2,208,586 | Kemmer | July 23, 1940 |
| 2,219,059 | Suchy et al. | Oct. 22, 1940 |
| 2,470,305 | Gross | May 17, 1949 |
| 2,762,702 | Howard | Sept. 11, 1956 |